United States Patent

Unrath et al.

[11] Patent Number: 6,056,799
[45] Date of Patent: May 2, 2000

[54] TUBULAR ACCORDION FILTER ELEMENT

[75] Inventors: Dieter Unrath, Weinheim; Margit Hofmann, Gorxheimertal, both of Germany

[73] Assignee: Firma Carl Freudenberg, Weinheim, Germany

[21] Appl. No.: 09/048,472

[22] Filed: Mar. 26, 1998

[30] Foreign Application Priority Data

Mar. 27, 1997 [DE] Germany .......................... 197 13 025

[51] Int. Cl.[7] .................................................. B01D 46/00
[52] U.S. Cl. .............................. 55/502; 55/357; 55/482; 55/498; 55/510
[58] Field of Search ................................... 55/385.3, 357, 55/482, 498, 502, 510, 514, 524, 505, 511; 123/198 E; 210/493.2, 493.5

[56] References Cited

U.S. PATENT DOCUMENTS

| | | |
|---|---|---|
| 4,036,616 | 7/1977 | Byrns ........................................ 55/514 |
| 4,056,376 | 11/1977 | Schuldenfrei .............................. 55/514 |
| 5,484,466 | 1/1996 | Brown et al. ............................. 55/514 |
| 5,487,767 | 1/1996 | Brown ....................................... 55/502 |
| 5,547,480 | 8/1996 | Coulonvaux .............................. 55/502 |
| 5,556,440 | 9/1996 | Mullins et al. ........................... 55/502 |
| 5,613,992 | 3/1997 | Engel ........................................ 55/502 |
| 5,685,985 | 11/1997 | Brown et al. ............................. 55/514 |
| 5,800,581 | 9/1998 | Gielink et al. ......................... 55/385.3 |

FOREIGN PATENT DOCUMENTS

| | | |
|---|---|---|
| 0 724 472 | 9/1997 | European Pat. Off. . |
| 34 39 194 | 4/1986 | Germany . |
| 44 41 608 | 6/1996 | Germany . |

*Primary Examiner*—David A. Simmons
*Assistant Examiner*—Minh-Chau T. Pham
*Attorney, Agent, or Firm*—Kenyon & Kenyon

[57] ABSTRACT

A tubular accordion filter element having at one end a U-shaped end piece of flexible sealing material embraces a filter body on the outside and inside in an annular manner. A necking is arranged on the outside of the end piece, extending away from the end face of the end piece, the necking being followed by a straight or frustoconical area.

9 Claims, 1 Drawing Sheet

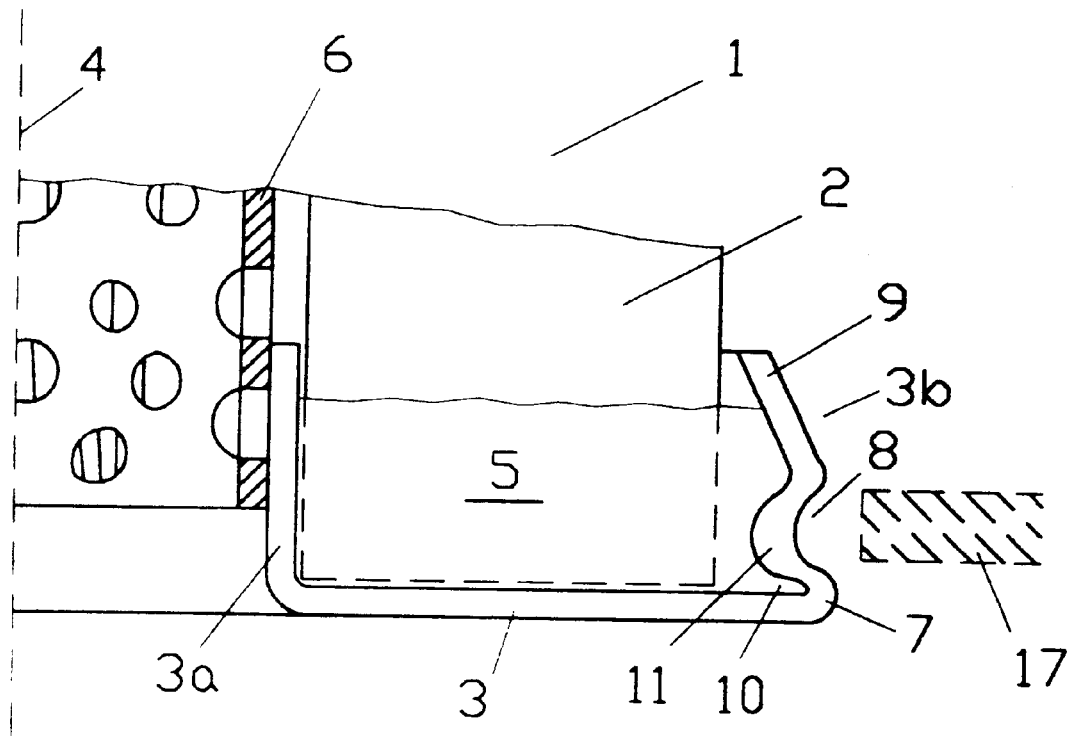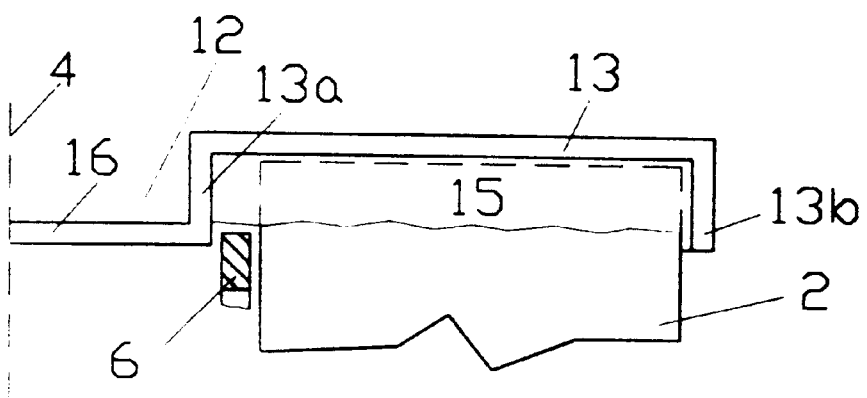

TUBULAR ACCORDION FILTER ELEMENT

FIELD OF THE INVENTION

The present invention is directed to the field of tubular accordion filter elements. Such elements are used, for example, to remove dust from air. The filters separate a clean-air region from a dust-laden air region. To this end, they are mounted on a carrier, to which they must be tightly joined.

BACKGROUND OF THE INVENTION

German patent 34 39 194 discloses a tubular accordion filter element having at its ends flexible end plates, made of a plastic molding compound, which form a truncated cone and are mounted in an annular shape around the filter element. The contact surface formed by the truncated cone extends to the filter element.

Furthermore, it is known from the German laid open publication 44 41 608 to seal off the end faces of the filter element with an elastic substance. This has the disadvantage that a mold is necessary for the elastic substance, as the filter element must be dipped into the mold and remain there until the elastic substance hardens. From EP-OS 0 724 472, an end piece is known made of irregularly placed fibers embedded in synthetic resin. In this case, one end of the filter is hermetically sealed.

An object of the present invention is to form the end pieces of an accordion filter element in a manner allowing their cost-effective production. Another object is to permit the securement of the accordion filter element to the carrier structure, which also provides a sealing function.

SUMMARY OF THE INVENTION

The present invention provides for the end piece to have on a radially exterior side piece a transition area, in the area of which adjacent to the end face of the end piece, the accordion filter element has a bulge, adjoined by a necking which extends away from the end face. This in turn is followed by a straight or frustoconical area.

A method for producing a tubular accordion filter element is also taught. A tubular filter body is embedded at the extremity into a molding compound and provided with a U-shaped end piece, by pouring the molding compound in the liquefied state into a U-shaped groove open parallel to the filter axis, the filter body subsequently being introduced into the groove and being partially immersed in the molding compound, and remaining there to produce a permanent bond.

BRIEF DESCRIPTION OF THE DRAWINGS

The invention will now be explained in greater detail with reference to the drawings, which illustrate two embodiments of end pieces of an accordion filter element in which:

FIG. 1 is a sectional view of an embodiment of an end piece constructed according to the principles of the invention, having a sealing function; and FIG. 2 is a sectional view of a further embodiment of an end piece made by deforming a plate that includes a dust-proof surface-area material.

DETAILED DESCRIPTION OF THE INVENTION

FIG. 1 shows the end region of an embodiment of an accordion filter element 1 of the invention. Filter body 2 partially extends into a U-shaped end piece 3, whose limbs 3a and 3b (which are connected by an end face) extend along a center axis 4 of the filter body 2.

A molding compound such as a hardenable synthetic resin 5 is poured, in its liquefied state, between limbs 3a and 3b of the end piece 3. Filter body 2 is then subsequently partially immersed in the synthetic resin 5. After synthetic resin 5 has hardened, a sealing bond is formed between filter body 2 and end piece 3.

Limb 3a is essentially cylindrical with respect to center axis 4, so that a cylindrical support body 6 can be inserted into the cavity enclosed by filter body 2. In so doing, a frictionally engaged connection is produced by surface pressure between limb 3a and support body 6.

Limb 3b too, extends essentially along center axis 4. In the area toward the end face of end piece 3, it has a sealing bulge 7, followed by a necking 8 and a section 9 running in a frustoconical manner toward the center axis. On the inner side of limb 3b in the area of bulge 7, an undercut 10 is produced by necking 8. This undercut 10 is increased by a thickening 11 in the area of necking 8, and in addition, an increased deformability of the end piece is produced in the area of necking 8. This allows a carrier structure 17 to be snapped into necking 8 and thickening 11 and reliably sealed there. The form closure in the area of necking 8 and the higher deformability contribute especially to that end.

An aperture plate 17 that engages with the necking 8 may be used as the carrier structure in the assembled state of accordion filter element 1. The lateral boundaries of necking 8 effect a type of locking engagement of the accordion-filter surface element in apertured plate 17, and a form-locking, but releasable joining is produced. Since it is desirable to disassemble accordion filter element 1 in the direction of the unfiltered gas side, which is the side on which filter body 2 is arranged, undercut 10 and bulge 7 must not extend substantially beyond the lateral boundary of necking 8 (in their radial extent) toward section 9.

Accordion filter element 1 is mounted from the filtered gas side by insertion into an aperture of apertured plate 17. In doing this, frustoconical section 9 facilitates the shifting of accordion filter element 1 in the area of end piece 3. During the shifting, end piece 3 is elastically deformed, particularly in the area of the boundary of necking 8, before the accordion filter element locks, with necking 8, in apertured plate 17.

In spite of the deformability of end piece 3 necessary to produce a mechanical anchoring, it has turned out that an average wall thickness of 3 to 8 mm is particularly advantageous. If the walls are too thick, the necessary sealing capacity of the deformed material cannot be applied. If the walls are too thin, the shearing stresses occurring when inserting accordion filter element 1 into apertured plate 17 can result in damage or destruction of end piece 3. Sealing is then no longer assured.

If desired, molding compound 5 within end piece 3 can additionally be utilized for its own intrinsic elasticity, in order to alter the mechanical anchoring of accordion filter element 1 in apertured plate 17. As a rule, however, the deformability of end piece 3 is sufficient to permit a reliable locking engagement.

The further frustoconical profile of limb 3b in area 9 allows an insertion of the accordion filter element into an existing opening.

In this context, it should be stressed that end piece 3 is made of flexible sealing material, for example foamed soft plastic such as PU (polyurethane fiber) foam, which means the sealing strength necessary to effect the sealing can be applied by elastic deformation of the sealing material.

Another cost-effective manufacturing method entails utilizing the thermoplastic deformation of a plastic material, foamed in a closed cell manner, such as a cross-linked polyolefin foam. In particular, an end piece can be produced by deep drawing after preceding heating. In the case of other materials, production by means of injection molding is also possible.

Limb 3b is disposed with a radial clearance relative to filter body 2, a contact also being able to take place in the area of thickening 11. This would result in an additional guidance or centering of filter body 2 in end piece 3. Basically, however, filter body 2 is centered by way of limb 3a, it being possible to provide an adequate mounting gap.

Shown in FIG. 2 is a second embodiment of an end piece, 12, which however, is not used to secure and seal the filter element to a supporting structure, but rather which covers filter body 2 on the face. End piece 12 is disk-shaped and has a rim 13 in the outer area. Rim 13 has a U-shaped profile with limbs 13a and 13b extending along center axis 4. For the connection to filter body 2, rim 13 is filled with a molding compound 15, in which filter body 2 is subsequently partially immersed. After molding compound 15 has hardened or solidified, the sealing joining is produced.

Inner limb 13a can be set back further toward center axis 4, beyond the inside radius of filter body 2, so that a free space is formed that is filled with molding compound 15. Support body 6 sits on this free space. Wear and tear of the surface-area material is avoided by this means, and greater mechanical strength is assured. This is of special importance in the case of changeable support bodies which, given the replacement of the accordion filter element, can be used again. The surface-area material can be made of paper or plastic.

In the area surrounding the center axis 4, end piece 12 is designed with an area 16 which covers the cavity enclosed by filter body 2. End piece 12 can be produced from a circular plate by deformation processes.

The advantage of the end pieces shown in FIG. 1 and FIG. 2 is that less molding compound is needed compared to end pieces made of solidified molding compound that have been used in the prior art. The solidification or hardening of the molding compound can take place in the end piece itself, and no longer takes place in the casting mold. Because of this, the casting molds can be eliminated, resulting in more cost-effective production.

What is claimed is:

1. A tubular accordion filter assembly having at least one end, comprising:

a filter body having an interior surface and an exterior surface;

an annular U-shaped end piece made of thin, flexible sealing material located at one end of the filter element, the end-piece having radially inner and outer sides joined by an end face, the U-shaped end piece annularly embracing the filter body with the inner and outer sides along the exterior and interior surfaces of the filter body, wherein arranged on the radially outer side of the end piece, extending away from the end face, is a necking which is followed by a straight or frustoconical area.

2. The accordion filter element as defined by claim 1, wherein a sealing bulge is formed in the outer side of the end piece adjacent the end face.

3. The accordion filter element as defined by claim 2, wherein, in the area of the sealing bulge, the end piece has a radially interiorly directed undercut.

4. The accordion filter element as defined by claim 2, wherein, in the area of the undercut there is a neck region that includes a thickening of the side relative to the surrounding area of the end piece.

5. The accordion filter element as defined by claim 1, wherein the straight or frustoconical section is disposed with a radial clearance with respect to the filter body.

6. The accordion filter element as defined by claim 4, wherein the straight or frustoconical section is disposed with a radial clearance with respect to the filter body.

7. The accordion filter element as defined by claim 1, wherein the end piece is made of foamed, soft plastic.

8. The accordion filter element as defined by claim 5, wherein the end piece is made of cross-linked polyolefin, foamed in a closed cell manner.

9. The accordion filter element as defined by claim 1, wherein the end piece is made of cross-linked polyolefin, foamed in a closed cell manner.

* * * * *